Jan. 12, 1965  S. W. BRIGGS  3,165,472
FILTER WITH FILTER AID
Filed June 23, 1960

INVENTOR
SOUTHWICK W. BRIGGS
BY Raymond Wheaton
ATTORNEY

United States Patent Office 3,165,472
Patented Jan. 12, 1965

3,165,472
FILTER WITH FILTER AID
Southwick W. Briggs, Howard County, Md. (% Stone Filter Corporation, 900 Franklin St. NE., Washington, D.C.)
Filed June 23, 1960, Ser. No. 38,275
5 Claims. (Cl. 210—457)

This invention relates to a filter and particularly a filter of the pleated paper type.

The oil filters in current use on railway freight engines are predominantly made of cotton and in many cases require renewal after only ten days of use, and under the best conditions observed they must be renewed before they have been in use for thirty days. Filters of these types ordinarily use such materials as cotton waste, cotton linters and shredded wood.

Whereas there have been efforts to substitute pleated paper filters of known types for the cotton filters, although their useful life is somewhat greater than that of the cotton filters, they do not reach their most effective operating conditions until after they have been in actual use for some time.

After extended research it has been found that by the application of textile fibers to the upstream surface of a pleated paper filter element, performance can be achieved which is vastly superior to that of the cotton filter or the ordinary pleated paper filter.

It is accordingly among the objects of the present invention to provide a filter comprising a permeable impregnated paper filter element having axial pleats defining a plurality of inner and outer peaks, the outer peaks being spaced apart and lying substantially in a cylinder, a permeable core disposed within the element in contact with the inner peaks, a permeable annular cover member embracing the outer peaks, and a layer of textile fibers disposed between the element and the cover member. The fibers are preferably cotton and exceedingly good results have been achieved with cotton linters.

It is also among the objects of this invention to provide a filter element comprising a permeable impregnated paper body having axial pleats and a layer of textile fibers disposed on one surface of the pleats. The fibers are preferably natural fibers and initially they will uniformly cover the pleats in most instances.

A more complete understanding of the invention will follow from a detailed description with reference to the accompanying drawings wherein.

Figure 1:
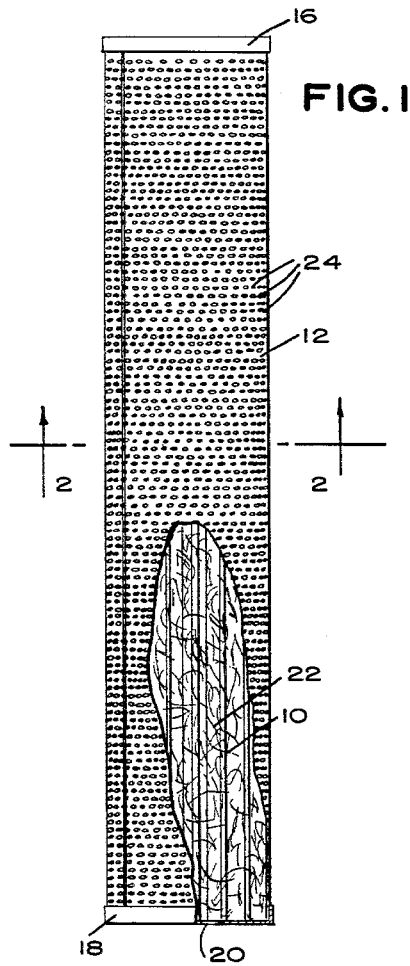
FIG. 1 is an elevation, partially broken away, depicting a filter conforming to the present invention.

In general, the filter shown in the drawings comprises an annularly arranged pleated filter element 10 circumscribed by a cover member 12 and containing a tubular core 14 having radial perforations 15. The material constituting these members may be paper impregnated with a resinous material such as a thermosetting phenolic condensation product in accordance with practice already common in the art. Also, as is well known in the art, suitable end caps 16 and 18 containing openings 20 in registry with the passage of the tubular core are provided and may be secured to the cover member 12 by means of a suitable thermosetting adhesive. Each of the end caps contains an opening 20 in registry with the passage formed in the tubular core 14.

Figure 2:
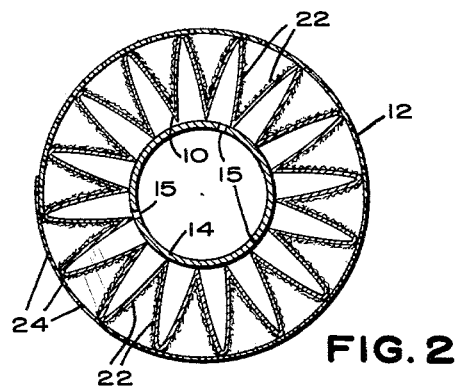
FIG. 2 is a section taken along line 2—2 of FIG. 1 on a somewhat enlarged scale.

The external surface of the pleated filter element 10 is provided with a layer of textile fibers 22, as best shown in FIGS. 1 and 2, which are preferably natural fibers such as cotton and/or wool linters or pilled cotton. These fibers can be introduced between the cover member 12 and the pleated filter element 10 in a variety of ways. A relatively simple method which has been employed quite satisfactorily has been to suspend such fibers in a current of air which is blown through the many radial openings 24 of the cover member, supplemented by the use of suction applied within the passage 15 of the tubular core 14.

Figure 4:
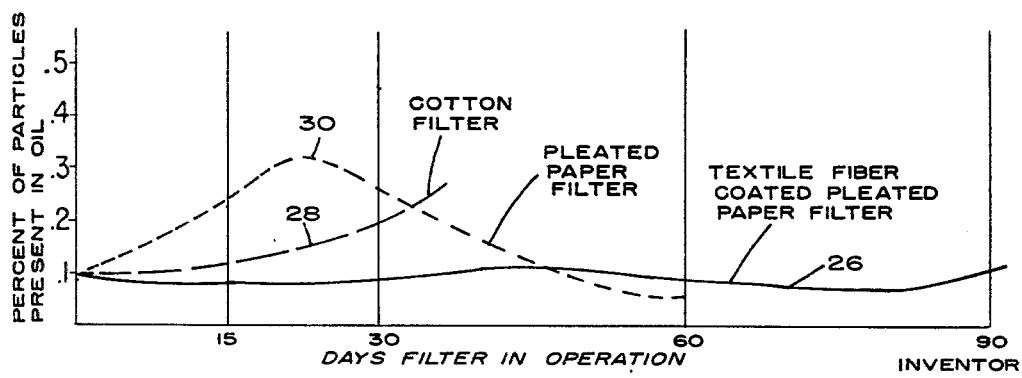
FIG. 4 is a representation by means of curves of the relative performance of conventional filters and that of the present invention.

Referring to FIG. 4 it will become evident that the substantially flat curve 26 experienced with the filter of the present invention represents a useful life approximating ninety days during which period the undesired particles present in the oil remain substantially within a range of 0.1%. By way of contrast, as will be apparent from the curve 28, conventional cotton filters produce comparable results for periods of less than fifteen days and become decreasingly efficient after a period of fifteen days. As illustrated by the curve 30, ordinary pleated paper filters provide an undesirable characteristic for a period of use of about forty-five days until a suitable cake builds up, whereupon their performance begins to improve.

Figure 3:
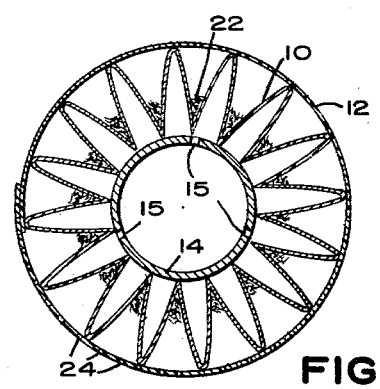
FIG. 3 is a section corresponding to that of FIG. 2 depicting the conditions prevailing after the filter has been in use.

After the filters conforming to the present invention have been used for a short time, the textile fibers 22 begin to migrate towards the core 14 until they become bunched in the pleats proximate to the core so as to assume a condition somewhat approaching that depicted in FIG. 3.

The performance of filters conforming to the present invention is not only vastly superior to that of conventional cotton filters, but the cost comparison is also highly advantageous.

Whereas only one specific form of the invention has been described with reference to the drawings, such variations as will occur to those skilled in the art are contemplated by the appended claims.

I claim:

1. A filter comprising a permeable impregnated paper filter element having axial pleats defining a plurality of inner and outer peaks, said outer peaks being spaced apart and lying substantially in a cylinder, a permeable core disposed within said element in contact with said inner peaks, a permeable annular cover member embracing said outer peaks, and a layer of mutually free loosely arranged textile fibers disposed between said element and said cover member.

2. A filter as set forth in claim 1 wherein said fibers are cotton.

3. A filter as set forth in claim 1 wherein said fibers are cotton linters.

4. A filter as set forth in claim 1 wherein said fibers are natural fibers.

5. A filter as set forth in claim 1 wherein said fibers substantially uniformly cover said pleats.

References Cited by the Examiner

UNITED STATES PATENTS

| | | | |
|---|---|---|---|
| 596,518 | 1/98 | Knight | 210—505 |
| 2,383,066 | 8/45 | McDermott | 210—493 X |
| 2,596,392 | 5/52 | Fessler | 210—75 X |
| 2,795,332 | 6/57 | Burla | 210—493 X |
| 2,860,784 | 11/58 | Breithaupt | 210—75 |
| 2,902,163 | 9/59 | Humbert | 210—493 X |
| 2,914,179 | 11/59 | Foust | 210—493 X |
| 2,919,807 | 1/60 | Briggs | 210—493 X |
| 2,960,232 | 11/60 | Gillette | 210—169 |

OTHER REFERENCES

Grant J. Hackh's Chemical Dictionary; The Blakiston Co., Philadelphia, 1944; Third Edition, page 341.

REUBEN FRIEDMAN, *Primary Examiner.*

HERBERT L. MARTIN, HERMAN BERMAN,
*Examiners.*